EPHRAIM M. BERRY AND LARKIN M. BERRY, OF SALTILLO, INDIANA.

Letters Patent No. 83,823, dated November 10, 1868.

IMPROVED MEDICAL COMPOUND.

The Schedule referred to in these Letters Patent and making part of the same.

*To all whom it may concern:*

Be it known that we, EPHRAIM M. BERRY and LARKIN M. BERRY, of Saltillo, in the county of Washington, and in the State of Indiana, have invented certain new and useful Improvements in Compound for Curing Epilepsy and other Nervous Diseases; and do hereby declare that the following is a full, clear, and exact description thereof.

Our invention, which we entitle "Berry's Compound, Anti-Spasmodic and Specific Remedy for Epilepsy and all Diseases of the Nervous System," is composed of the following ingredients, viz:

Two ounces *Persulphate ferri;* two drachms stramonium; three ounces stillingia; half ounce valerian; three ounces oil of sassafras; which ingredients are put into one gallon of alcohol, and sufficient loaf-sugar added, that, when reduced to one gallon of the compound, it will make a sirup.

This compound is especially effective as a remedy for spasms, fits, and any diseases of the nervous system, and should be taken as follows:

For a child from one to two years old, three to five drops; from five to ten years, ten to fifteen drops.

For adults, twenty-five to thirty drops, every three hours until change of symptoms, then three times a day until a cure is effected.

We do not, however, confine ourselves to the proportions of the ingredients above mentioned, nor to the doses prescribed, as they may be varied according to circumstances.

What we claim as new, and desire to secure by Letters Patent, is—

The compound above described, substantially as and for the purposes herein set forth.

In testimony that we claim the foregoing, we have hereunto set our hands, this 14th day of May 1868.

EPHRAIM M. BERRY.
LARKIN M. BERRY.

Witnesses:
W. C. BERRY,
M. J. MEAD.